Nov. 6, 1923.
T. MIDGLEY
1,472,881
METHOD AND APPARATUS FOR MOLDING TIRE CASINGS
Filed Dec. 10, 1921
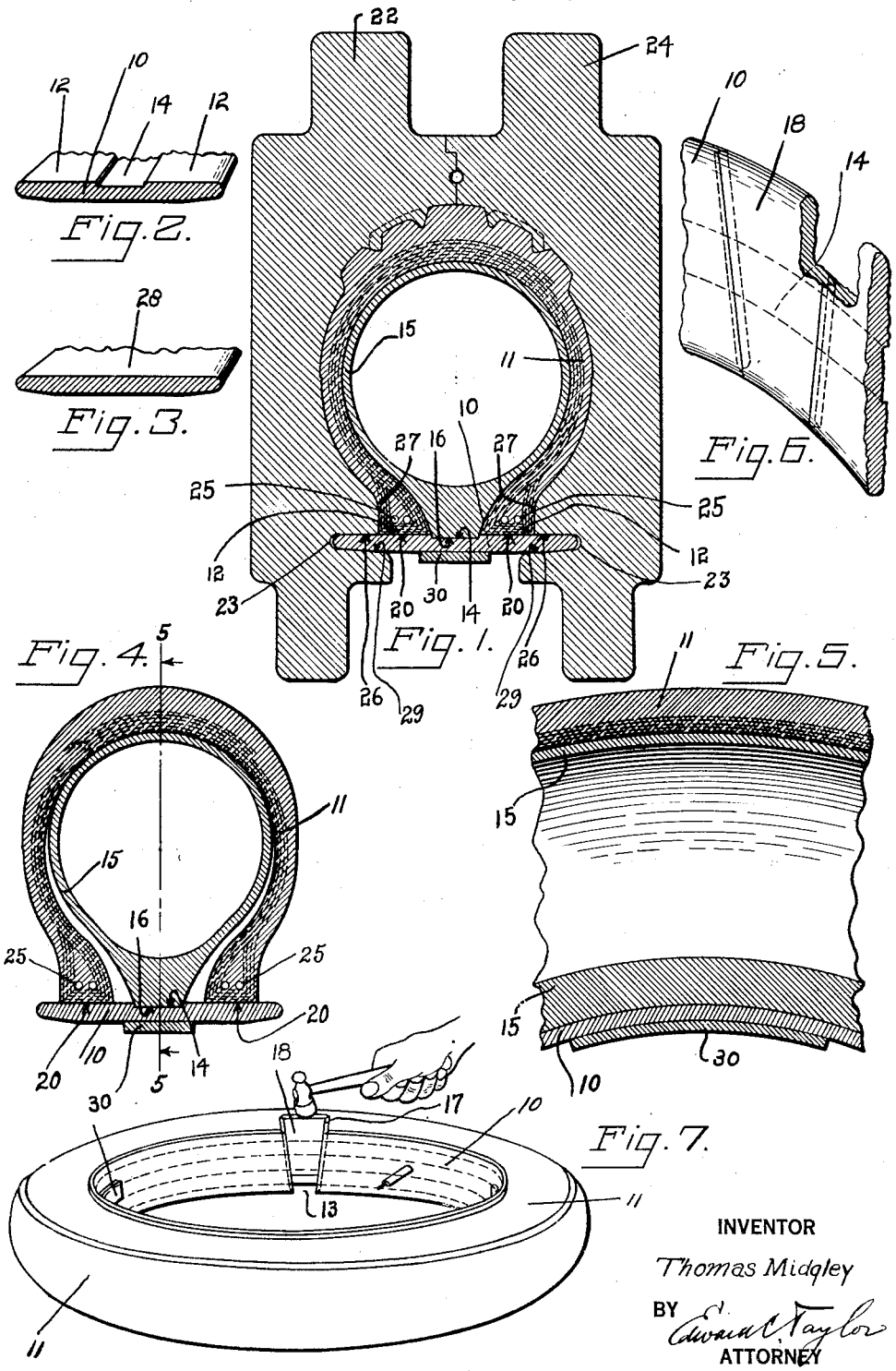
INVENTOR
*Thomas Midgley*
BY
*Edward Taylor*
ATTORNEY Patented Nov. 6, 1923.

1,472,881

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

METHOD AND APPARATUS FOR MOLDING TIRE CASINGS.

Application filed December 10, 1921. Serial No. 521,403.

*To all whom it may concern:*

Be it known that I, THOMAS MIDGLEY, a citizen of the United States of America, residing at Hampden, in the county of Hampden and State of Massachusetts, have invented certain new and useful Improvements in Methods and Apparatus for Molding Tire Casings, of which the following is a specification.

My invention relates to mold equipment used in shaping and vulcanizing pneumatic tire casings and particularly to a combination of mold parts especially adapted for forming the beads of such tire casings.

It is one object of my invention to provide an annular ring adapted to press radially outward against the bases of the tire beads throughout their circumference, which ring can be quickly assembled with and parted from the tire casings. This annular ring, from now on referred to as a bead ring, is simple in construction and effective in its operation. Another object of my invention is to provide a pair of mold sections which when used in combination with the bead ring will provide a molding unit for forming an improved tire bead. It is a further object of my invention to provide a quick and more satisfactory method of positioning a tire casing in a vulcanizing unit ready for vulcanization.

In the manufacture of tire casings which are subjected to internal expansion during vulcanization, difficulty has been experienced in correctly positioning the raw tire casing in a mold ready for such vulcanization without impairing the tire bead. The shape of the beads of an unvulcanized tire is different than the shape of the beads of a tire after vulcanization. The beads of a raw tire casing are also of greater volume than the beads of a vulcanized casing. It therefore follows that before an uncured tire casing is positioned in the molding units ready for vulcanization, the beads must have their shape changed considerably as well as be compressed by the closing together of the molding units, in order to assume the shape and size of the bead of the finished tire. It is during this mold closing process that the bead is frequently distorted from the final shape desired and it has been a problem to make well shaped beads free from fabric wrinkled bases or deformed toes.

For overcoming these difficulties I provide a method and apparatus whereby a raw tire casing can be quickly and efficiently positioned ready for vulcanization. My invention will now be described with reference to the accompanying drawings: in which, Fig. 1 is a cross-section taken through a tire molding unit embodying my invention and shows the relative positions of the molding parts ready for the vulcanization of a tire casing;

Fig. 2 is a perspective view of a small segment of the preferred form of bead ring;

Fig. 3 is a perpscetive view of a small segment of a slightly modified bead ring having a transversely flat out-side cylindrical face;

Fig. 4 is a cross-section taken through a bead ring and a tire casing having an inflatable bag therein, the whole being assembled as a unit and ready to be positioned in a mold ready for the vulcanization of the casing;

Fig. 5 is a longitudinal section of a segment of the combination shown in Fig. 4, the section being taken through the line 5—5 of Fig. 4;

Fig. 6 is a perspective view of a small segment of the bead ring showing bead ring expanding and contracting means as seen when looking from the inside of the ring; and Fig. 7 is a perspective view of the bead ring being assembled with a raw tire casing.

The apparatus used in carrying out my invention comprises a bead ring 10 and a pair of mold members 22 and 24 having a tire receiving cavity inside. The bead-forming part of the mold which is especially adapted to cooperate with the bead ring has a pair of annular recesses 23 cut therein. The bead ring 10 has two smooth cylindrical outside surfaces 12 between which surfaces is a circumferential recess 14. The ring is transversely split as shown at 13, Fig. 7 and is expanded by employing a wedge segment 18, which segment has V-shaped edges 17 slidable in V-shaped grooves in the split edges of the ring.

In preparing a tire casing for vulcanization I apply a bead ring 10 to a tire casing 11, which contains an inflatable bag 15, prior to placing the tire casing between the vulcanizing mold members 22 and 24. The ring is applied around the outside of the tire base as shown in Fig. 7 and the ring is expanded radially against the base of the tire by driving in the wedge ring segment 18. The bead bases 20 of the casing are thus effectively pressed radially and supported against the cylindrical outside surfaces 12 of the bead ring. The position of the casing and the inflatable bag 15 mounted upon the bead ring are shown in Fig. 4. The beads 25 of the casing are well spread apart as shown and although the base 16 of the inflatable bag is shown engaging with the recess 14 of the bead ring, this engagement is not necessary although preferable at this point of the assemblage.

This combination is now placed between the mold sections 22 and 24, the mold recesses 23 receiving the bead ring 10. As the mold sections are closed together, the bead ring, which is in slidable contact with the sides 26 and 29 of the recesses 23 of the mold, enters the recesses and finally assumes the position shown in Fig. 1. During the closing of the molds the beads of the tire casing are moved by the inside surfaces 27 of the molds from its position shown in Fig. 4 to the position shown in Fig. 1 and the base 16 of the inflatable bag assumes its position in the recess 14 of the bead ring. The casing is now in the position in which it is to be later vulcanized.

The wrinkled fabric base, which as previously stated is a frequent defect in tire casings, is generally caused by mold shoulders which dig into the bead bases, pushing up waves of rubberized fabric in front of them and folding over these waves upon the base of the bead during the closing of the molds. According to the practice of my invention the bases of the beads are pressed radially outward throughout their circumference and that pressure is maintained during the closing of the molds. The base of the bead slides along the smooth surface of the bead ring as the molds are closed and no such shoulder as described comes in contact with the base of the bead to cause the described wrinkles.

Another frequent defect in tire casings caused during the closing of the molds is the tendency of the toes of the bead to tilt up and dig into the side of the base of the internal expanding bag. This defect is serious for it not only spoils the shape of the bead toe but leaves an injurious groove around the sidewall of the base of the bag. According to my practice of closing the molds the toes of the bead cannot tilt up as described but will at all times lie pressed against the outside face of the ring.

The described bead ring may be substituted by a slightly modified ring shown in Fig. 3. The modified bead ring is used in the same manner as the bead ring already described, the only difference in the rings being that the modified ring has a transversely flat outside cylindrical surface 28 rather than a cylindrical outside surface broken by a circumferential recess 14 as shown in Fig. 2. The lugs 30 which are positioned at intervals around the inside face of the ring are used to facilitate removing the ring from the molds.

From the foregoing description it is seen that positioning a tire ready for vulcanization in a molding unit according to my procedure is quick and efficient. In applying my bead ring to the tire I merely expand the ring so that it will circumferentially support the bead bases and apply by a radial outward pressure. The tire casing and the inflatable bag automatically assume their correct molding positions relative to the molding combination as the mold sections are closed.

Having thus described my invention, I claim:

1. In combination with a tire mold in which a tire having basal annular beads and containing an inflatable bag may be vulcanized, a bead supporting ring which is split to provide for expansion and contraction of the ring and which has a circumferential recess for registering with the base of the inflatable bag and a pair of substantially smooth outside cylindrical surfaces which are the only ring surfaces in contact with the tire beads.

2. A method of placing a tire carcass having basal annular beads in a mold ready for vulcanization comprising circumferentially supporting the bases of the beads by a radial outward pressure and causing the bases of the beads to slide over the support during the closing of the mold.

3. In an apparatus for molding tire casings, having basal annular beads, a pair of mating mold sections having a tire receiving cavity therein, a pair of annular recesses in each of the inside faces of the mold sections, a bead ring adapted to fit into the annular mold recesses and having a pair of substantially smooth outside cylindrical bead supporting surfaces of equal diameter from each bead supporting surface transversely outward to the nearest edge of the ring, a cylindrical recess in the outside face of the bead ring between the bead supporting surfaces, the bead ring having a transverse split to allow for expansion and contraction of the same, a ring wedge segment which is insertable in the transverse split to expand and contract the ring and one or more lugs located around the inside face of the ring.

4. A tire mold in which a tire casing having basal annular beads may be vulcanized, a pair of substantially annular recesses in the inside face of the mold, and a bead ring having a pair of substantially smooth outside bead supporting surfaces of equal diameter from each bead supporting surface transversely outward to the nearest edge of the ring, a cylindrical recess in the outside face of the bead ring between the bead supporting surfaces, the bead ring having a transverse split to allow for expansion and contraction of the ring and being adapted to slide into the mold recesses during the closing of the molds.

THOMAS MIDGLEY.